(12) United States Patent
Bonardi (10) Patent No.: US 12,502,699 B2
(45) Date of Patent: Dec. 23, 2025

(54) MACHINE AND METHOD FOR REMOVING LABELS FROM REUSABLE CONTAINERS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 18/561,440

(22) PCT Filed: May 10, 2022

(86) PCT No.: PCT/EP2022/062687
§ 371 (c)(1),
(2) Date: Nov. 16, 2023

(87) PCT Pub. No.: WO2022/243117
PCT Pub. Date: Nov. 24, 2022

(65) Prior Publication Data
US 2024/0253092 A1    Aug. 1, 2024

(30) Foreign Application Priority Data
May 20, 2021   (IT) .................. 102021000013049

(51) Int. Cl.
*B08B 9/08*    (2006.01)
*B08B 5/02*    (2006.01)
*B08B 5/04*    (2006.01)
*B08B 9/28*    (2006.01)
*B08B 9/32*    (2006.01)
(Continued)

(52) U.S. Cl.
CPC .............. *B08B 9/083* (2013.01); *B08B 5/023* (2013.01); *B08B 5/04* (2013.01); *B08B 9/283* (2013.01); *B08B 9/32* (2013.01); *B08B 9/34* (2013.01); *B08B 11/02* (2013.01); *B08B 2209/08* (2013.01)

(58) Field of Classification Search
None
See application file for complete search history.

(56) References Cited

U.S. PATENT DOCUMENTS

| | | | | |
|---|---|---|---|---|
| 5,885,401 A | * | 3/1999 | Eiban | ...................... B08B 9/083 156/709 |
| 6,199,615 B1 | | 3/2001 | Klarl | |
| 2018/0264528 A1 | * | 9/2018 | Wu | ........................... B08B 1/32 |

FOREIGN PATENT DOCUMENTS

| | | |
|---|---|---|
| CN | 110420947 A | 11/2019 |
| DE | 196 18 363 A1 | 6/1997 |

(Continued)

OTHER PUBLICATIONS

International Search Report and Written Opinion issued Sep. 9, 2022, which pertains to PCT Application No. PCT/EP2022/062687, filed May 10, 2022. 9 pages.

*Primary Examiner* — Rita P Adhlakha
(74) *Attorney, Agent, or Firm* — THOMPSON HINE LLP (57) ABSTRACT

A machine for removing labels from reusable containers includes a support for at least one reusable container, to which at least one label to be removed is applied on its lateral surface, and is provided with at least one cutting device adapted to perform at least one at least partial cut of the label, and elements for removing the label from the container which include nozzles for emitting at least one high-pressure jet of fluid toward the label.

12 Claims, 6 Drawing Sheets

(51) Int. Cl.
  *B08B 9/34* (2006.01)
  *B08B 11/02* (2006.01)

(56) References Cited

FOREIGN PATENT DOCUMENTS

KR 20100034170 A 4/2010
WO 2015172182 A1 11/2015

* cited by examiner

MACHINE AND METHOD FOR REMOVING LABELS FROM REUSABLE CONTAINERS

The present invention relates to a machine and a method for removing labels from reusable containers.

In order to limit the dispersion of plastic packaging and containers in the environment, the use of reusable plastic containers has been made mandatory in some countries.

In this case, reusable containers, normally provided with a label on their outer lateral surface, are returned by the users, after their use, so that they can be subsequently stripped of their labels, washed and sterilized, so as to make them ready to be labeled and filled again and therefore reused.

Typically, the labels that are applied to reusable containers are obtained from a label ribbon made of plastic material and are wrapped around the lateral surface of the corresponding container, gluing one of their ends onto the other.

In order to remove the labels from the used containers, currently the labels are cut, along a direction substantially parallel to the axis of the corresponding containers, by means of a blade.

Once the label has been cut in this way, the container is inserted in washing machines, which wash it.

Although this procedure is conceptually valid, it has been found that the provision of a cut in the labels is not sufficient for their complete removal from the containers and their consequent separation from said containers.

In fact, the used containers that are collected in order to be reused can have, between the label and their lateral surface, glue residues from previous processing that are not removed during washing, or traces of other sticky substances, such as sugar or the like, which tend to keep the labels attached to the containers even after they have been cut.

The aim of the present invention is to provide a machine and a method for removing labels from reusable containers that is capable of improving the background art in one or more of the above mentioned aspects.

Within this aim, an object of the invention is to provide a machine capable of completely removing and efficiently separating the labels from the containers designed to be reused.

Another object of the invention is to provide a machine for removing labels from reusable containers that is constructively simple and reliable.

A further object of the present invention is to overcome the drawbacks of the background art in a manner that is alternative to any existing solutions.

Not least object of the invention is to provide a machine for removing labels from reusable containers that can be produced at competitive costs.

This aim and these and other objects which will become better apparent hereinafter are achieved by a machine for removing labels from reusable containers according to claim 1, optionally provided with one or more of the characteristics of the dependent claims.

Further characteristics and advantages of the invention will become better apparent from the description of a preferred but not exclusive embodiment of the machine according to the invention, illustrated by way of non-limiting example in the accompanying drawings, wherein.

With reference to the figures, the machine according to the invention, generally designated by the reference numeral 1, comprises supporting means 2 for at least one reusable container 3, on the lateral surface 3a of which has at least one label 4 to be removed applied thereto, said label being wound around the axis of the container 3.

The machine has, furthermore, at least one cutting device 5 designed to perform at least one at least partial cut of the label 4, preferably along a direction substantially parallel to the axis of the container 3.

According to the invention, there are means for removing the label 4 from the container 3 which comprise means 6 for emitting one or more high-pressure jets of a fluid toward the label 4, so as to cause its complete detachment from the container 3. The fluid dispensed by the emission means 6 is constituted preferably by a gas and, more particularly, by air or, as an alternative, may also be constituted by a liquid, such as for example water.

Preferably, the jets of fluid are emitted by the emission means 6 at a pressure substantially comprised between 5 and 8 bars.

Advantageously, the supporting means 2 comprise rotation means 7 which have the function of rotating the container 3 about its own axis.

More particularly, the emission means 6 face a portion 8 of the lateral surface 3a of the container 3 and are oriented so as to emit their own jets of fluid in a direction that is substantially opposite with respect to the direction of the tangential speed imparted to the portion 8 of the lateral surface 3a of the container 3 by the rotation means 7, so that the jets of fluid dispensed by the emission means 6 are directed against the movement of the label 4 in the region in which they act on said label, so as to obtain an effective action of removal of the label 4 from the container 3.

Advantageously, the emission means 6 are adapted to emit jets of fluid intermittently. More particularly, the emission means 6 are preferably capable of emitting the jets with a frequency of one jet every 10-20 milliseconds.

Conveniently, the emission means 6 are activated in order to dispense the jets of fluid in a manner that is synchronized with the rotation imparted to the container 3 by the rotation means 7.

Conveniently, the emission means 6 are arranged laterally adjacent and advantageously in a position proximate to the cutting device 5. Preferably, the emission means 6 are mounted on board of said cutting device 5.

More particularly, the emission means 6 are conveniently arranged upstream of the cutting device 5 with respect to the direction of rotation imparted by the rotation means 7 to the container 3.

Advantageously, the emission means 6 are constituted by at least one pair of nozzles 9a, 9b which are arranged so as to be mutually superimposed along a direction that is substantially parallel to the axis of the container 3.

In particular, the nozzles 9a, 9b are respectively arranged substantially above and below with respect to the position of the label 4 on the container 3 and are inclined in a mutually converging manner in order to direct the jets of fluids dispensed by them in the region of the container 3 that is affected by the label 4.

Figure 6:
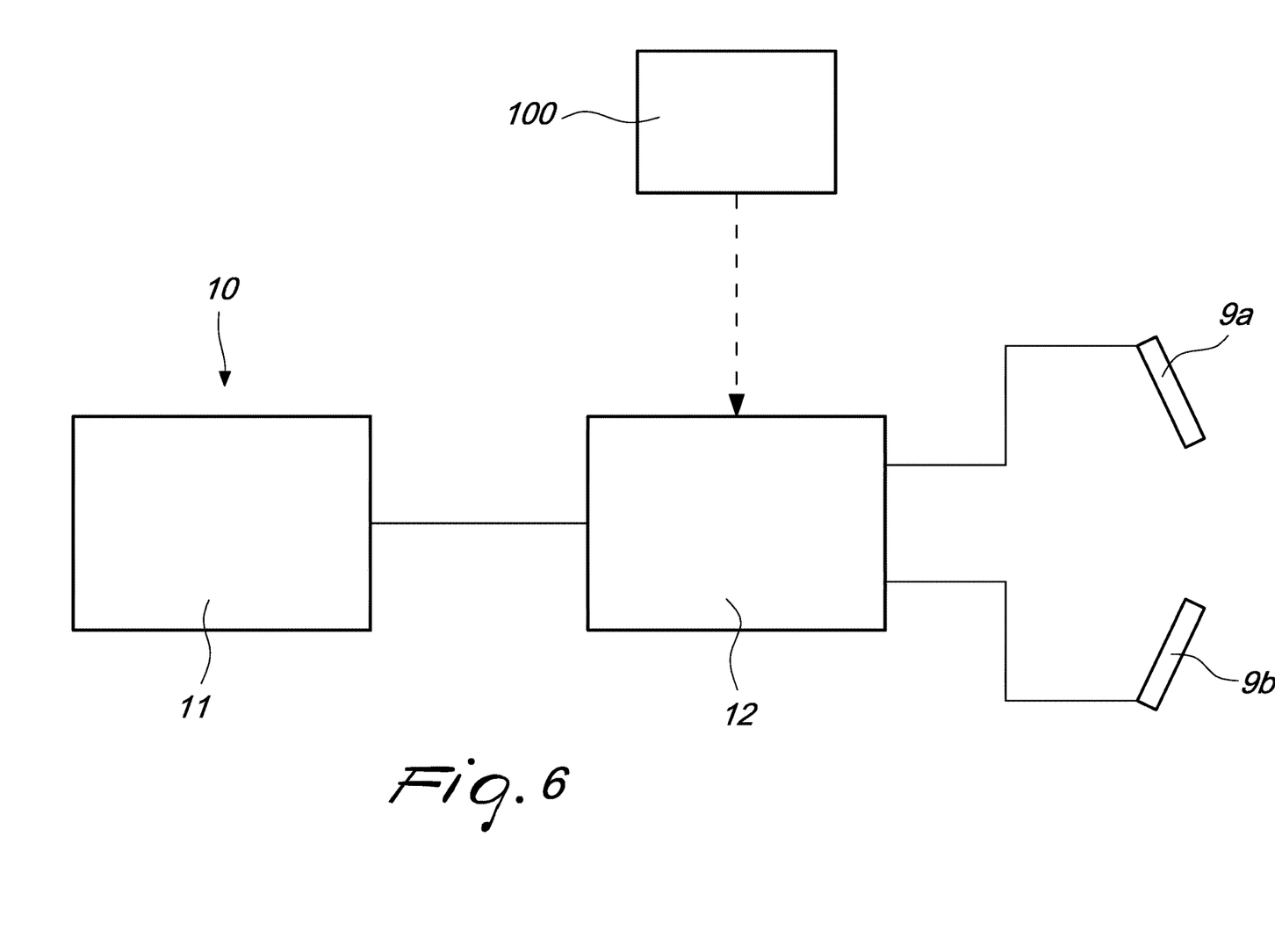
FIG. 6 is a schematic view of a fluid-operated circuit of the machine according to the invention.

Conveniently, the nozzles 9a and 9b are connected to a fluid-operated circuit 10 comprising a pressurized fluid manifold 11 and intake valve means which control the opening and closure of the connection between the manifold 11 and the nozzles 9a, 9b.

In particular, the valve means comprise at least one multiple-way electric valve 12, connected to the manifold 11 and to the nozzles 9a, 9b, which is actuated conveniently by means of impulses for activation/deactivation of the ways connected to the nozzles 9a, 9b so as to send alternatively the pressurized fluid originating from the manifold 11 to one or the other of the two nozzles 9a, 9b, thus allowing the nozzles 9a and 9b to emit alternately pulsed jets of fluid.

With reference to the embodiment shown, the cutting device 5 comprises at least one blade 13, arranged so as to face, with its cutting portion, the label 4 applied to the container 3 and supported by a framework 14 which supports, advantageously, also the emission means 6.

The cutting device 5 is furthermore provided with means adapted to create a difference in pressure between the opposite faces of the label 4, in order to impart an expansion movement to the label 4 with the consequent separation of the label 4 from the lateral surface 3a of the container 3, so as to bring the label 4 to hit the cutting portion of the blade 13, thus causing its cutting.

Such means that allow to create a difference in pressure between the opposite faces of the label 4 are, conveniently, provided by means for blowing pressurized air between the label 4 and the lateral surface 3a of the container 3, which are conveniently provided by means of an adapted pressurized air injector 15, which is mounted on the framework 14, for example above the blade 13, and oriented toward a region proximate to the upper edge of the label 4.

It should be noted that advantageously the blade 13 is arranged on a vertical plane passing through the axis of the container 3, while the nozzles 9a, 9b are ideally arranged substantially on a plane which is parallel and laterally spaced with respect to the plane on which the blade 13 lies.

With reference to the embodiment shown in the figures, it should be noted that the supporting means 2 can conveniently be provided by means 16 for conveying the container 3 along an advancement path.

In this case, the cutting device 5 and the emission means 6 are movable integrally with the conveyance means 16, so as to be able to operate while they follow the container 3 in its movement along an advancement path, as will be explained better also hereinafter.

For example, the conveyance means 16 are constituted by a carousel 17 which turns about its own axis. In this case, the rotation means 7 can be advantageously provided by a rotating plate 18, which is arranged at the peripheral region of the carousel and on which the container 3 is rested.

More preferably, the carousel 17 may be provided with multiple plates 18, arranged, mutually angularly spaced, around the axis of the carousel 17, each designed to receive by resting a respective container 3 from which the corresponding label 4 must be removed.

Above the or each plate 18 it is possible to provide a respective retention head 19, which engages the upper part of the container 3, ensuring its resting on the corresponding plate 18.

Again if the supporting means 2 comprise the conveyance means 16, the framework 14 that supports the cutting device 5 and the emission means 6 is conveniently connected to movement means synchronized with the movement imparted to the container 3 by the conveyance means 16, so that the cutting device 5 and the emission means 6 can follow the container 3, along at least one portion of its advancement path on the conveyance means 16, moving substantially at the same speed with which the container 3 is moved by the conveyance means 16 along its advancement path.

Optionally, it is possible to pair each of the plates 18 of the carousel 17 with a respective framework 14 which supports a respective cutting device 5 and respective emission means 6. In this case, the framework 14 paired with each plate 18 may be fixed integrally to the carousel 17.

As an alternative, it is also possible to provide for the presence, on the machine, of a single cutting device 5 with the emission means 6 arranged laterally adjacent, which is supported by a framework 14 which is connected to movement means which actuate its movement first forward, i.e., in the same direction of advancement of the conveyance means 16, and then backward, i.e., in the opposite direction with respect to the direction of advancement of the conveyance means 16.

In particular, in this case, in the forward movement of the framework 14, the cutting device 5 and the emission means 6 follow, in a synchronized manner, the movement of a container 3 arranged on the conveyance means 16 along its advancement path, following a forward trajectory, from a starting position to an arrival position, during which the cutting device 5 and the emission means 6 are activated to remove the label 4 on the container 3. Subsequently, once the framework 14 has reached the arrival position, the framework 14 is moved backwards, following, at a higher speed than that with which it followed the forward trajectory, a return trajectory from the arrival position to the starting position, so as to bring the cutting device 5 and the emission means 6 to operate on a subsequent container 3, which transits on the conveyance means 16, on which a label 4 to be removed is applied.

Moreover, the machine is advantageously provided with control means 100, constituted for example by a programmable electronic controller, which are functionally connected to the cutting device 5 and to the emission means 6 and are configured to control the activation of the emission means 6 simultaneously or, more preferably, directly after the activation of the cutting device 5.

Advantageously, the rotation means 7 are driven, optionally by the same control means 100, so as to start the rotation of the container 3, only after the activation of the cutting device 5.

Conveniently, also the electric valve 12 that controls the nozzles 9a, 9b is controlled by the control means 100, as shown schematically in FIG. 6.

Conveniently, the activation of the emission means 6 is maintained for a time sufficient to allow the container 3 to perform a rotation about its own axis through an angle of predetermined breadth, for example an angle equal at least to 300°.

Advantageously, there are moreover suction means having the task of picking up the label 4, once it has been removed from the container 3, following the activation of the cutting device 5 and the emission means 6.

In particular, the suction means are provided conveniently by means of a suction inlet 20, facing the supporting means 2 of the container 3 and connected, by means of a conveyance duct 21, to air suction means.

More particularly, as in the illustrated embodiment, the suction inlet 20 is arranged laterally to the conveyance means 16, along the advancement path of the container 3, on the opposite side with respect to the cutting device 5 and the emission means 6.

The operation of the machine, according to the invention, is as follows.

Figure 1:
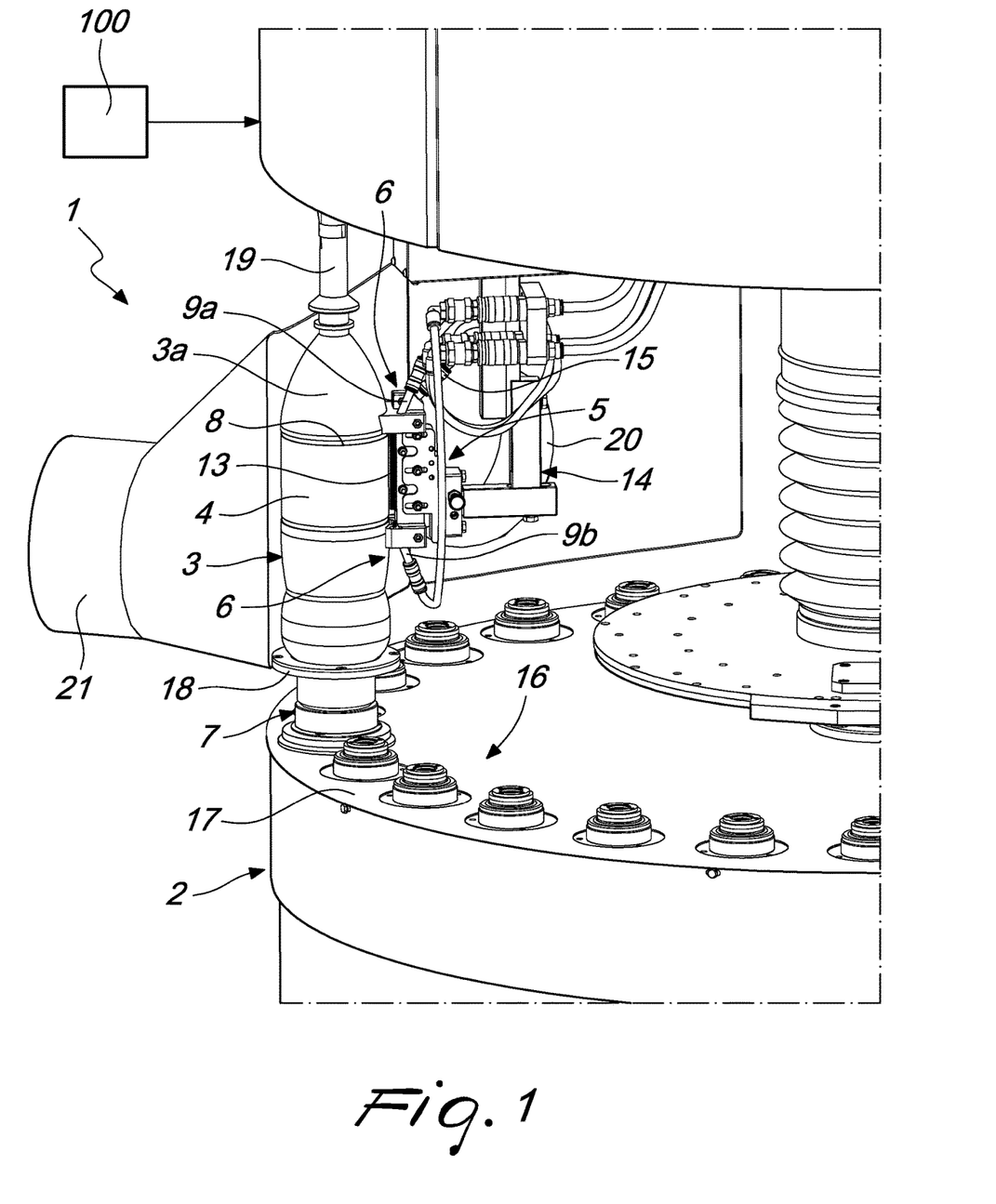
FIG. 1 is a perspective view of the machine according to the invention.

A container 3 with a label 4 to be removed applied thereto, which is wrapped around its lateral surface 3a, is loaded on a plate 18 of the carousel 17, on which it is kept resting by the retention head 19, being in a position facing the cutting device 5 and the emission means 6, as shown in FIG. 1.

Figure 2:
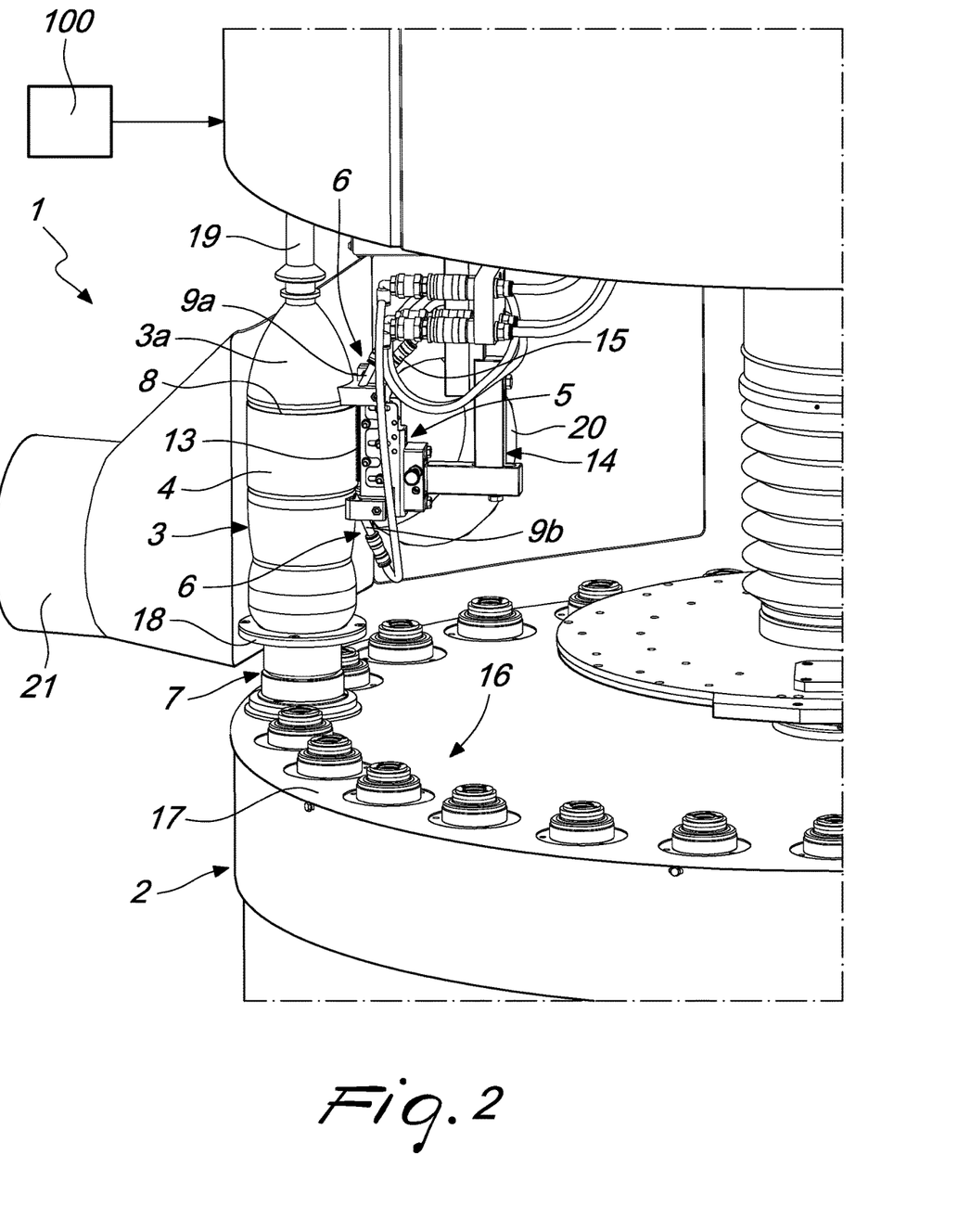
FIGS. 2 to 5 are perspective views of a sequence of operating steps of the machine according to the invention.

While the container 3 proceeds along its advancement path defined by the carousel 17, the framework 14 that supports the cutting device 5 and the emission means 6 follows the container 3 and the cutting device 5 is activated, by means of the activation of the injector 15 which emits a jet of air between the label 4 and the lateral surface of the container 3, so as to separate a portion of the label 4 from the container 3, thus pushing it against the blade 13 which cuts it, as in the situation shown in FIG. 2.

Figure 3:
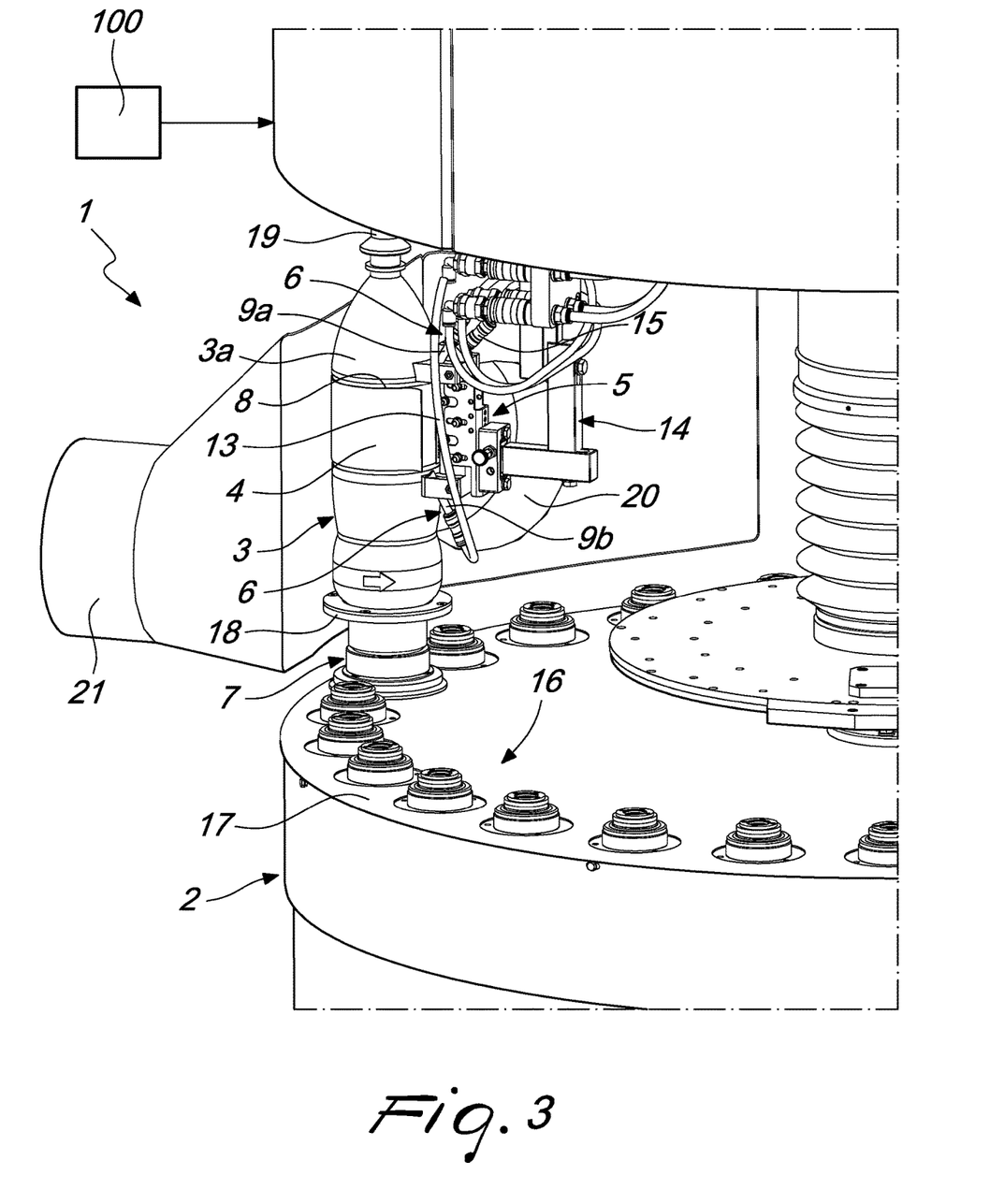

At this point, the emission means 6 are activated so that the nozzles 9*a* and 9*b* emit in an intermittent and alternating manner jets of high pressure fluid toward the container 3 and, more particularly, toward the label 4, and at the same time the rotation of the plate 18 on which the container 3 is resting is activated, so that the container 3 can rotate about its own axis, moving, with the portion 8 of its lateral surface 3*a* against which the jets of fluid emitted by the nozzles 9*a*, 9*b* are directed, in a direction that is opposite the direction of said jets of fluid, with consequent lifting of a cut flap of the label 4 due to the combined effect of the action of the jets of fluid dispensed by the emission means 6 and of the rotation of the container 3, as shown by FIG. 3.

Figure 4:
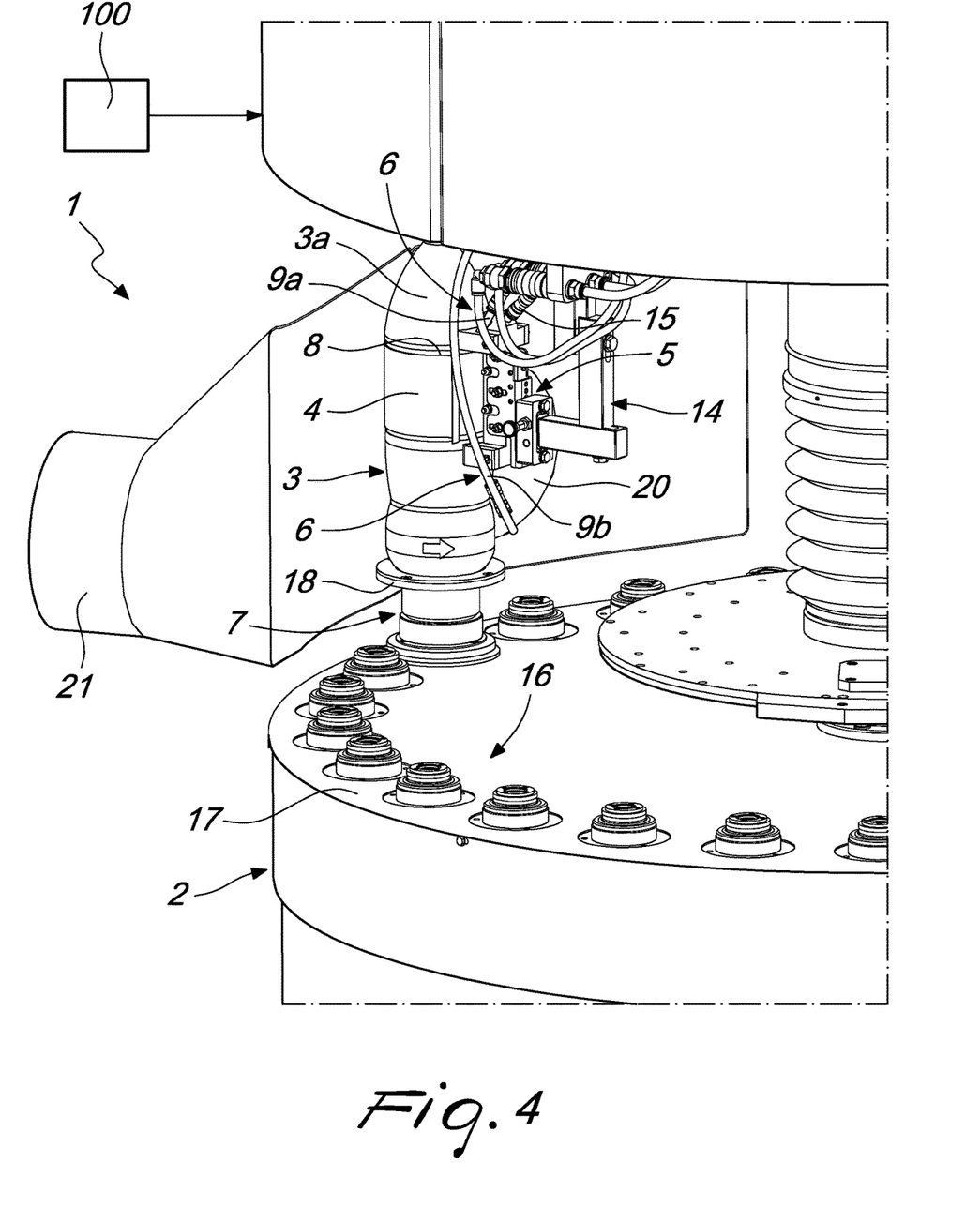

As the container 3 rotates about its own axis and proceeds along its advancement path, the jets of fluid dispensed by the nozzles 9*a*, 9*b* progressively detach the label 4 from the container 3, overcoming the adhesion action of any residues of glue or other sticky substances, as shown by FIG. 4.

Figure 5:
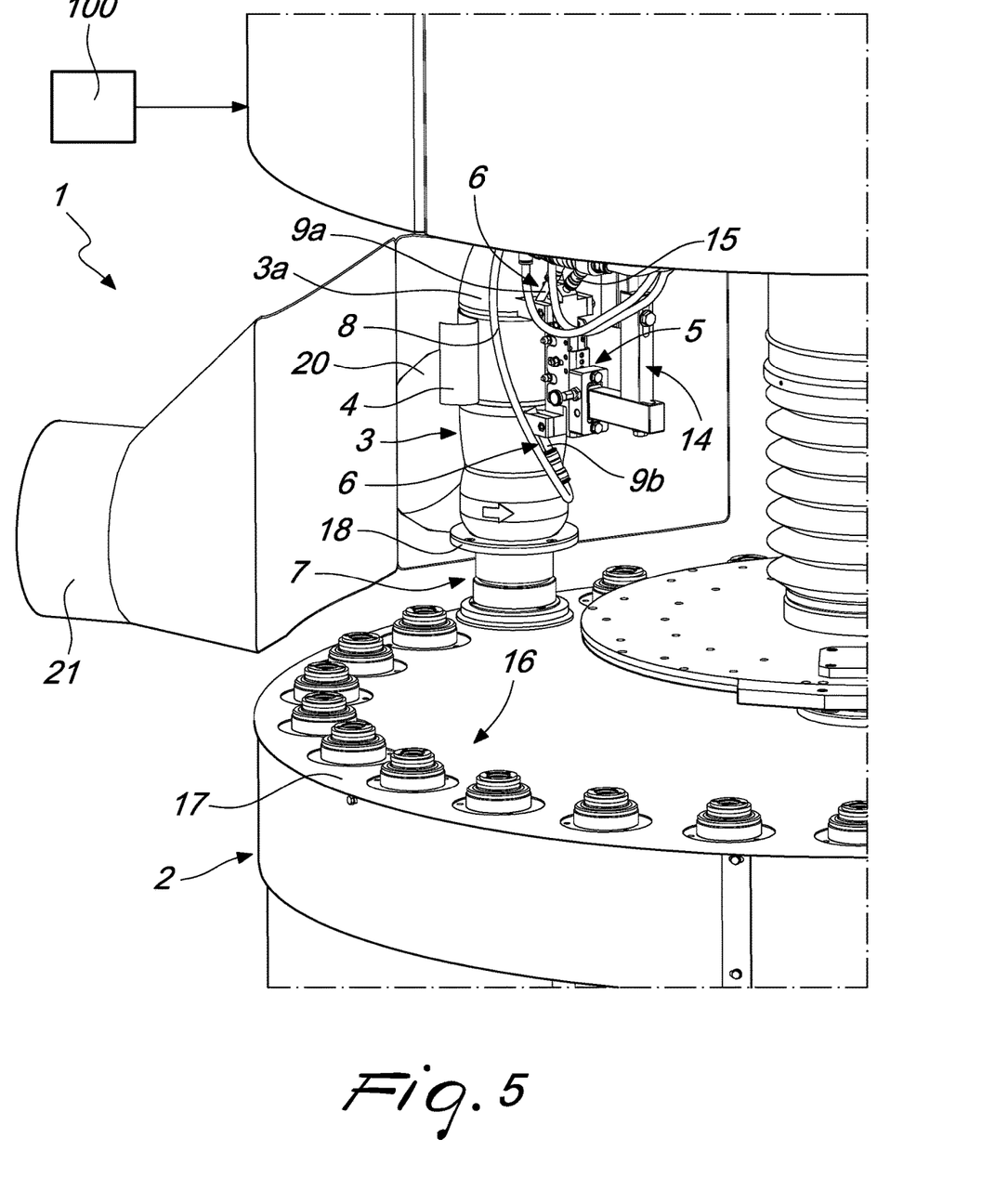

Once the container 3 has reached the position in which the suction inlet 20 is located, as in the situation shown in FIG. 5, the label 4, now almost completely detached from the container 3, is separated from the container 3 by the action of the force of attraction applied by the suction inlet 20 and is then drawn into the conveyance duct 21.

At this point, the container 3 may be collected by the carousel 17 without the label 4 and ready for the subsequent treatments in order to make it suitable for a new use.

In practice it has been found that the invention has achieved the intended aim and objects, providing a machine that allows to remove effectively the labels from reusable containers, even in presence of residues of glue or other substances which make the complete removal thereof difficult.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Italian Patent Application No. 102021000013049 from which this application claims priority are incorporated herein by reference.

The invention claimed is:

1. A machine for removing labels from reusable containers, comprising:
    supporting means for at least one reusable container, to which at least one label to be removed is applied on a lateral surface thereof, and provided with at least one cutting device adapted to perform at least one at least partial cut of said label, and further comprising means for removing said label from said container which comprise emission means for emitting at least one high-pressure jet of fluid toward said label;
    wherein said supporting means comprise rotation means adapted to rotate said container about an axis thereof, said emission means facing a portion of the lateral surface of said container and being oriented so as to emit said at least one jet of fluid in a direction that is substantially opposite with respect to a direction of a tangential speed imparted to said portion of the lateral surface of said container by said rotation means.

2. The machine according to claim 1, wherein said emission means are adapted to emit said at least one jet of fluid intermittently.

3. The machine according to claim 1, wherein said emission means are activated to dispense said at least one jet of fluid in a manner that is synchronized with a rotation imparted to said container by said rotation means.

4. The machine according to claim 1, wherein said emission means are arranged laterally adjacent to said cutting device.

5. The machine according to claim 1, wherein said emission means are arranged upstream of said cutting device with respect to a direction of rotation imparted by said rotation means to said at least one container.

6. The machine according to claim 1, wherein said emission means comprise at least one pair of nozzles which are arranged so as to be mutually superimposed along a direction that is substantially parallel to the axis of said container.

7. The machine according to claim 6, wherein said at least one pair of nozzles are respectively arranged substantially above and below with respect to the position of said label on said container and are inclined in a mutually converging manner in order to direct the jets of fluids dispensed by them in the region of said container that is affected by said label.

8. The machine according to claim 6, wherein said at least one pair of nozzles are activated to dispense the respective jets of fluid alternately.

9. The machine according to claim 1, wherein said supporting means comprise means for conveying said container along an advancement path, said cutting device and said emission means being movable integrally with said conveyance means.

10. The machine according to claim 1, further comprising control means which are functionally connected to said cutting device and to said emission means, said control means being adapted to actuate an activation of said emission means directly after an activation of said cutting device.

11. The machine according to claim 1, wherein said rotation means are configured to be activated on command after the activation of said cutting device.

12. The machine according to claim 1, further comprising suction means adapted to pick up said label once the label has been removed from said container.

\* \* \* \* \*